United States Patent
Takumi

(10) Patent No.: US 11,194,619 B2
(45) Date of Patent: Dec. 7, 2021

(54) INFORMATION PROCESSING SYSTEM AND NON-TRANSITORY COMPUTER READABLE MEDIUM STORING PROGRAM FOR MULTITENANT SERVICE

(71) Applicant: FUJIFILM Business Innovation Corp., Tokyo (JP)

(72) Inventor: Satoshi Takumi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 69 days.

(21) Appl. No.: 16/529,748

(22) Filed: Aug. 1, 2019

(65) Prior Publication Data

US 2020/0301732 A1 Sep. 24, 2020

(30) Foreign Application Priority Data

Mar. 18, 2019 (JP) .............................. JP2019-049704

(51) Int. Cl.
*G06F 9/46* (2006.01)
*G06F 9/48* (2006.01)
*G06F 9/50* (2006.01)

(52) U.S. Cl.
CPC ............ *G06F 9/4818* (2013.01); *G06F 9/485* (2013.01); *G06F 9/5011* (2013.01)

(58) Field of Classification Search
CPC ....... G06F 9/4818; G06F 9/5011; G06F 9/485
See application file for complete search history.

(56) References Cited

U.S. PATENT DOCUMENTS

| | | | | |
|---|---|---|---|---|
| 10,657,004 | B1* | 5/2020 | Dalmia | G06F 16/128 |
| 2002/0129123 | A1* | 9/2002 | Johnson | H04L 65/4084 |
| | | | | 709/219 |
| 2002/0141425 | A1* | 10/2002 | Merani | H04L 47/24 |
| | | | | 370/412 |
| 2004/0125800 | A1* | 7/2004 | Zellner | H04W 72/10 |
| | | | | 370/389 |
| 2004/0181700 | A1* | 9/2004 | Katoh | G06F 1/3203 |
| | | | | 713/300 |
| 2006/0047856 | A1* | 3/2006 | Tripathi | H04L 67/1002 |
| | | | | 709/250 |
| 2011/0069666 | A1* | 3/2011 | Kahn | H04W 72/10 |
| | | | | 370/329 |

(Continued)

FOREIGN PATENT DOCUMENTS

JP 2017091330 5/2017

*Primary Examiner* — Adam Lee
(74) *Attorney, Agent, or Firm* — JCIPRNET

(57) ABSTRACT

An information processing system for a multitenant service is proposed. The system includes memory queues and a processor. Processing requests issued from tenants are received through a network, where the number of the memory queues is smaller than the number of the tenants, and a priority is given to each of the memory queues. A priority of the processing request issued from each of the tenants is specified, based on a rank set with respect to each of the tenants and the amount of a used calculation resource for a predetermined period of time for each of the tenants, and the processing requests are retained in the memory queues according to the priorities. The retained processing requests are extracted from the memory queues in an order specified based on the priorities to execute processing corresponding to the processing requests.

8 Claims, 4 Drawing Sheets

(56) References Cited

U.S. PATENT DOCUMENTS

| | | | |
|---|---|---|---|
| 2011/0113200 A1* | 5/2011 | Moses | G06F 12/0888 |
| | | | 711/130 |
| 2011/0131584 A1* | 6/2011 | Wang | H04L 67/10 |
| | | | 718/104 |
| 2011/0138091 A1* | 6/2011 | Housty | G06F 9/4401 |
| | | | 710/113 |
| 2011/0202926 A1* | 8/2011 | Chambliss | G06F 9/5038 |
| | | | 718/104 |
| 2011/0321052 A1* | 12/2011 | Long | G06F 9/4881 |
| | | | 718/103 |
| 2013/0061232 A1* | 3/2013 | Bernbo | G06F 3/067 |
| | | | 718/103 |
| 2013/0254407 A1* | 9/2013 | Pijewski | H04L 29/08189 |
| | | | 709/226 |
| 2014/0074965 A1* | 3/2014 | Xu | G06F 9/4818 |
| | | | 709/217 |
| 2014/0075445 A1* | 3/2014 | Wang | G06F 9/50 |
| | | | 718/104 |
| 2014/0165070 A1* | 6/2014 | Persikov | G06F 11/3096 |
| | | | 718/103 |
| 2014/0201752 A1* | 7/2014 | Agrawal | G06F 9/5011 |
| | | | 718/104 |
| 2014/0359113 A1* | 12/2014 | Krebs | H04L 67/10 |
| | | | 709/224 |
| 2015/0046279 A1* | 2/2015 | Wang | G06F 3/0482 |
| | | | 705/26.3 |
| 2015/0178135 A1* | 6/2015 | Wang | H04L 45/021 |
| | | | 718/104 |
| 2015/0249546 A1* | 9/2015 | Zheng | H04L 47/621 |
| | | | 370/442 |
| 2016/0117195 A1* | 4/2016 | Wang | G06F 9/5072 |
| | | | 707/770 |
| 2017/0075570 A1* | 3/2017 | Yoon | G06F 3/0611 |
| 2017/0132046 A1* | 5/2017 | Ben Zeev | H04L 47/805 |
| 2017/0177406 A1* | 6/2017 | Chen | G06F 9/4831 |
| 2017/0251076 A1* | 8/2017 | Bellur | H04L 29/06523 |
| 2018/0220276 A1* | 8/2018 | Senarath | H04L 12/1403 |
| 2018/0375784 A1* | 12/2018 | Balakrishnan | H04L 47/6275 |
| 2018/0376281 A1* | 12/2018 | Guo | H04W 52/245 |
| 2019/0138244 A1* | 5/2019 | Singh | G06F 3/067 |
| 2020/0007453 A1* | 1/2020 | Maniyar | H04L 67/306 |
| 2020/0104230 A1* | 4/2020 | Hasija | G06F 9/4881 |

* cited by examiner

FIG. 3

| HIGH | MIDDLE | LOW | PRIORITY |
|---|---|---|---|
| 0 TO 50 | | | P5 |
| 51 TO 100 | 0 TO 50 | | P4 |
| 101 TO | 51 TO 100 | 0 TO 50 | P3 |
| | 101 TO | 51 TO 100 | P2 |
| | | 101 TO | P1 |

INFORMATION PROCESSING SYSTEM AND NON-TRANSITORY COMPUTER READABLE MEDIUM STORING PROGRAM FOR MULTITENANT SERVICE

CROSS-REFERENCE TO RELATED APPLICATIONS

This application is based on and claims priority under 35 USC 119 from Japanese Patent Application No. 2019-049704 filed Mar. 18, 2019.

BACKGROUND

(i) Technical Field

The present invention relates to an information processing system and a non-transitory computer readable medium storing a program.

(ii) Related Art

In a multitenant type cloud service, in order to avoid occupancy of a resource by a specific tenant, a task control for executing processing (task) is performed based on a priority specified in accordance with a rank of the tenant.

JP2017-091330A discloses a calculator system that includes a first calculator that requests execution of a task for which a priority is designated; a second calculator that includes a plurality of task queues that receive the execution request of the task from the first calculator and store the received execution request based on a designated first priority and a task execution controller that commands task execution to a third calculator based on the priorities of the task queues; and a plurality of the third calculators that receive the execution request of the task from the second calculator and execute the received task.

Further, JP2017-091330A discloses that the priority is based on the rank set with respect to the tenant.

SUMMARY

In a method for preparing a queue for each tenant, retaining a request, reading out the request from the queue in accordance with a rank of the tenant, and executing a process, there is a case where it is not realistic in terms of a configuration of a system. For example, there is a case where it is difficult to cope with a case where the number of tenants is extremely large.

Aspects of non-limiting embodiments of the present disclosure relate to an image processing system capable of avoiding occupancy of a resource by a specific tenant, in a case where an execution control of a task is performed using queues of which the number is equal to or smaller than the number of tenants in a multitenant type cloud service.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including: a request retaining unit that retains a processing request issued from an issue source of a processing request, in which the number of the request retaining units is smaller than the number of the issue sources, and a priority is given to each of the request retaining units; a first control unit that specifies the priority of the processing request issued from each issue source, based on a rank set with respect to the issue source and the amount of a used calculation resource for a predetermined period of time for each issue source, and retains the processing request in the request retaining unit corresponding to the priority; and a second control unit that extracts the processing request from the request retaining unit in an order specified based on the priorities to cause the processing unit to execute the processing.

BRIEF DESCRIPTION OF THE DRAWINGS

Exemplary embodiment(s) of the present invention will be described in detail based on the following figures, wherein:

FIGS. 2A and 2B are flowcharts showing an operation of the information processing system, in which FIG. 2A is a diagram for illustrating an operation of a request receiving section, and FIG. 2B is a diagram for illustrating an operation of a control section;

FIG. 3 is a chart showing an example of a relationship between ranks of tenants, amounts of used resources, and priorities.

DETAILED DESCRIPTION

Hereinafter, exemplary embodiments of the present invention will be described in detail with reference to the accompanying drawings.

Configuration of System

An information processing system 100 of an embodiment of the present disclosure provides a service by receiving a processing request from a tenant 200, and executing processing based on the received processing request. The tenant 200 is a logically divided unit of a user that uses the service provided from the information processing system 100. That is, the tenant 200 makes a processing request to the information processing system 100, so that the processing in the information processing system 100 is executed.

Figure 1:
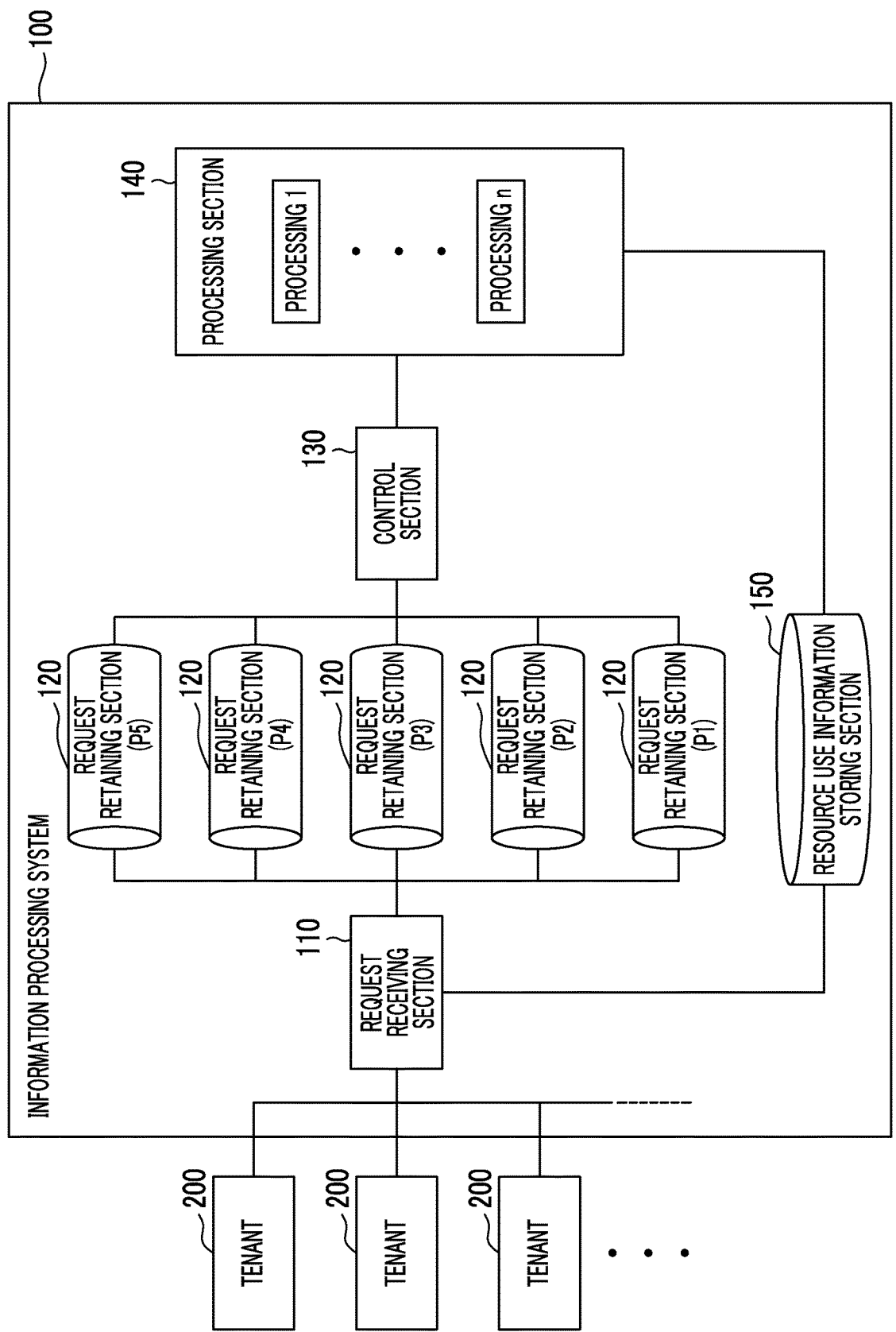
FIG. 1 is a diagram showing an overall configuration of an information processing system to which an embodiment of the present disclosure is applied.

FIG. 1 is a diagram showing an overall configuration of the information processing system to which the exemplary embodiment is applied. The information processing system 100 according to the exemplary embodiment includes a request receiving section 110, a request retaining section 120, a control section 130, a processing section 140, and a resource use information storing section 150. The information processing system 100 is realized by a server constructed on a network, for example. The information processing system 100 may be realized by a single server machine, or may be realized by dividing its functions into a plurality of servers. The service from the information processing system 100 may be provided as a so-called cloud service.

The server that realizes the information processing system 100 may be a physical server, or may be a virtual server. In any case, the server includes a central processing unit (CPU) that is an operating unit, a main storing device (main memory) that is a storing unit, and an external storing device. The CPU reads a program stored in the external storing device into the main storing device for execution. As the main storing device, for example, a random access memory (RAM) may be used. As the external storing device, for example, a magnetic disc device, a solid state drive (SSD), or the like may be used. As the CPU executes the program, respective functions in the information processing system 100 are realized.

The request receiving section 110 receives a processing request issued from the tenant 200, and distributes the received processing request to the request retaining section 120. Specifically, the request receiving section 110 specifies a priority of the processing request received from each tenant 200, based on a rank set with respect to the tenant 200 and the amount of a used resource (calculation resource) in a predetermined period for each tenant 200. Further, the request receiving section 110 causes the request retaining section 120 corresponding to the specified priority to retain the processing request. The request receiving section 110 is an example of a first control unit. The method for specifying the priority and the rank of the tenant 200 will be described later.

The request retaining section 120 is a storing device that retains the processing request received by the request receiving section 110. A plurality of the request retaining sections 120 are provided, and priorities are set for the respective request retaining sections 120. More specifically, the number of the request retaining sections 120 provided in the information processing system 100 is smaller than the number of tenants 200, and is a number based on the number of steps of the set priorities. In the example shown in FIG. 1, five steps of priorities of P1 to P5 are set, and five request retaining sections 120 are provided. Here, the respective priorities are set in the order of P5>P4>P3>P2>P1. Each request retaining section 120 is a first-in first-out memory (queue). The request retaining section 120 is an example of a request retaining unit.

The control section 130 extracts the processing request from the request retaining section 120 in the order specified based on the priority, and causes the processing section 140 to execute the processing. The control section 130 determines whether the processing requests are sequentially retained from a high-priority request retaining section 120, and determine whether to read out the processing request retained in the request retaining section 120 based on an operation status of the processing section 140. Further, the control section 130 transmits the processing request read out from the request retaining section 120 to the processing section 140 so that the processing section 140 executes the processing based on the processing request. The control section 130 is an example of a second control unit, and a control unit. Further, the control section 130 acquires information on an occupancy rate of the processing in the processing section 140 from the processing section 140, with respect to the operation status of the processing section 140 that is considered in determining whether to read out the processing request. Accordingly, the control section 130 is an example of an occupancy rate acquiring unit. A procedure of reading out the processing request from the request retaining section 120 by the control section 130 and a method for determining whether to read out the processing request by the control section 130 will be described later.

The processing section 140 executes the processing based on the processing request received from the control section 130. The processing section 140 may execute a plurality of the processes in parallel. That is, the respective processes based on the processing requests in the processing section 140 may be independently executed. In the example shown in FIG. 1, the processing section 140 is disclosed as a component of the information processing system 100, but an external server capable of being connected through a network may be used as the processing section 140 to execute the processing based on the processing request.

The processing section 140 executes the processing based on the processing request, and transmits the information indicating the operation status that is considered for determining whether to readout the processing request by the control section 130, to the control section 130. Further, the processing section 140 transmits information on the amount of a used resource necessary for executing the processing based on the processing request, and a processing time, to the resource use information storing section 150. The amount of the used resource may include a processing execution time using the CPU, a storage capacity of a storing device used in the process, or the number of times of processing execution, or the like. For example, the processing section 140 sorts information indicating that the processing request is executed for each tenant 200 that has issued the processing request, and transmits the result to the resource use information storing section 150. The processing section 140 is an example of a processing unit.

The resource use information storing section 150 acquires information on the amount of the used resource necessary for execution of the processing and the processing time from the processing section 140, and retains the result. As the resource use information storing section 150, for example, a storing unit such as a magnetic disc device or an SSD, an external storage server, or the like may be used. The information retained in the resource use information storing section 150 is taken into consideration in a case where the request receiving section 110 specifies the priority of the processing request.

The tenant 200 is a user that uses the information processing system 100, and transmits a processing request to the information processing system 100. The tenant 200 may be set in a variety of forms in accordance with content, an operating method, a specification, or the like of the service provided by the information processing system 100. For example, the tenant 200 may be set in association with a company, a department of the company, or a different organization thereof, or may be set for each customer. As described above, a rank is set with respect to each tenant 200. The rank of the tenant 200 may be set based on a variety of setting methods. For example, the rank may be set based on a charging plan for using the service from the information processing system 100. For example, a high rank is given to a tenant 200 that is contracted with a high-charged plan. The number of ranks may be set in a variety of manners in accordance with content, an operating method, a specification, or the like, of the service provided by the information processing system 100.

Operation of Information Processing System 100

Figure 2A:
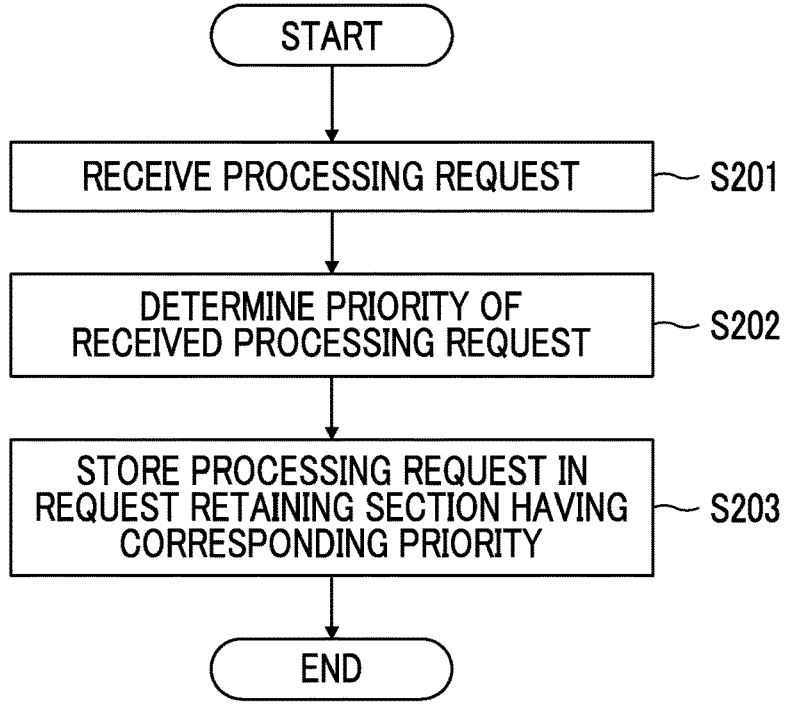
Figure 2B:
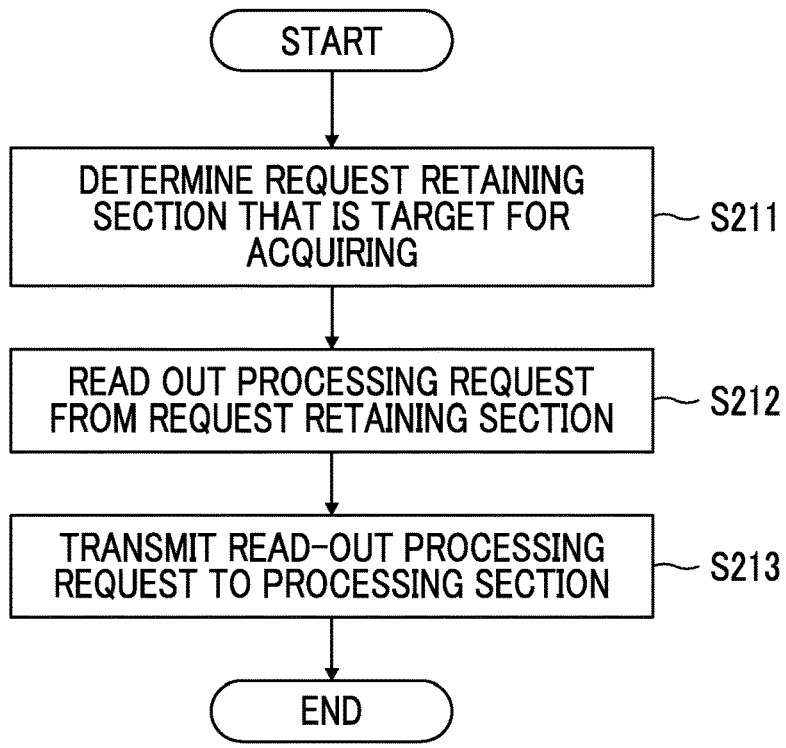

FIGS. 2A and 2B are flowcharts showing an operation of the information processing system 100. FIG. 2A is a diagram showing an operation of the request receiving section 110, and FIG. 2B is a diagram showing an operation of the control section 130.

In a case where the request receiving section 110 receives a processing request from the tenant 200 (S201), the request receiving section 110 determines a priority of the received processing request based on a rank of the tenant 200 that issues the processing request and the amount of a used resource of the processing section 140 (S202). Further, the request receiving section 110 stores the processing request in the request retaining section 120 having the corresponding priority, in accordance with the specified priority (S203).

The control section 130 determines the request retaining section 120 that is a target for acquiring the processing request based on the priority and an operation status of the processing section 140 (S211). Further, the control section 130 reads out the processing request from the request retaining section 120 determined as the acquisition target (S212), and transmits the read-out processing request to the processing section 140 (S213).

Method for Specifying Priority of Processing Request

Next, a method for specifying the priority of the processing request by the request receiving section 110 will be described. The priority of the processing request is specified based on the rank of the tenant 200 that has issued the processing request and the amount of the used resource of the processing section 140. For example, with respect to the rank of each tenant 200, the priority is specified so that the priority becomes higher as the amount of the used resource becomes smaller. For example, the priority of the processing request is specified based on the amount of the used resource in the tenant 200 for a predetermined period of time, from a time point when the request receiving section 110 receives one processing request issued from one tenant 200. As a specific example, as the number of times of reception of the processing request for one hour immediately before the time point when the processing request is received becomes smaller, the priority may be set to become higher. The information on the amount of the used resource for the predetermined period of time (for example, the number of times of reception of the processing request) may be acquired by referring to the resource use information storing section 150 by the request receiving section 110.

Further, the priority is specified so that the highest priority given to the processing request issued from the tenant 200 of a certain rank becomes lower than the highest priority given to the processing request issued from the tenant 200 of a rank higher than the certain rank. Similarly, the priority may be specified so that the lowest priority given to the processing request issued from the tenant 200 of a certain rank becomes higher than the lowest priority given to the processing request issued from the tenant 200 of a rank higher than the certain rank.

FIG. 3 is a chart showing an example of a relationship between ranks, amounts of used resources, and priorities of the tenants 200. In the example shown in FIG. 3, the ranks of the tenants 200 are divided into "high", "middle", and "low", and the amount of the used resources are set to the number of times of reception of the processing request for one hour immediately before. Referring to FIG. 3, with respect to the processing request received from the tenant 200 of the "high" rank, the priority is P5 in a case where the amount of the used resources is 0 to 50 times. Further, in a case where the amount of the used resources is 51 to 100 times, the priority is P4, and in a case where the amount of the used resources is equal to greater than 101, the priority is P3. Similarly, with respect to the processing request received from the tenant 200 of the "middle" rank, the priority is P4 in a case where the amount of the used resources is 0 to 50 times, the priority is P3 in a case where the amount of the used resources is 51 to 100 times, and the priority is P2 in a case where the amount of the used resources is equal to or greater than 101 times. Further, with respect to the processing request received from the tenant 200 of the "low" rank, the priority is P3 in a case where the amount of the used resources is 0 to 50 times, the priority is P2 in a case where the amount of the used resources is 51 to 100 times, and the priority is P1 in a case where the amount of the used resources is equal to or greater than 101 times.

In the example shown in FIG. 3, as described above, in the respective ranks of the tenants 200, the priority becomes higher as the amount of the used resources becomes smaller. Further, in the tenant 200 of the "high" rank, the highest priority is P5, and the lowest priority is P3. In the tenant 200 of the "middle" rank, the highest priority is P4, and the lowest priority is P2. In the tenant 200 of the "low" rank, the highest priority is P3, and the lowest priority is P1. That is, in a relationship between the tenant 200 of the "high" rank and the tenant 200 of the "middle" or "low" rank, and a relationship between the tenant 200 of the "middle" rank and the tenant 200 of the "low" rank, the above-described specifying methods are reflected, respectively.

The request receiving section 110 specifies the priorities of processing requests received from the respective tenants 200 based on the above-described specifying methods. Further, the request receiving section 110 causes the request retaining section 120 corresponding to the specified priority to retain the processing request.

Figure 4:
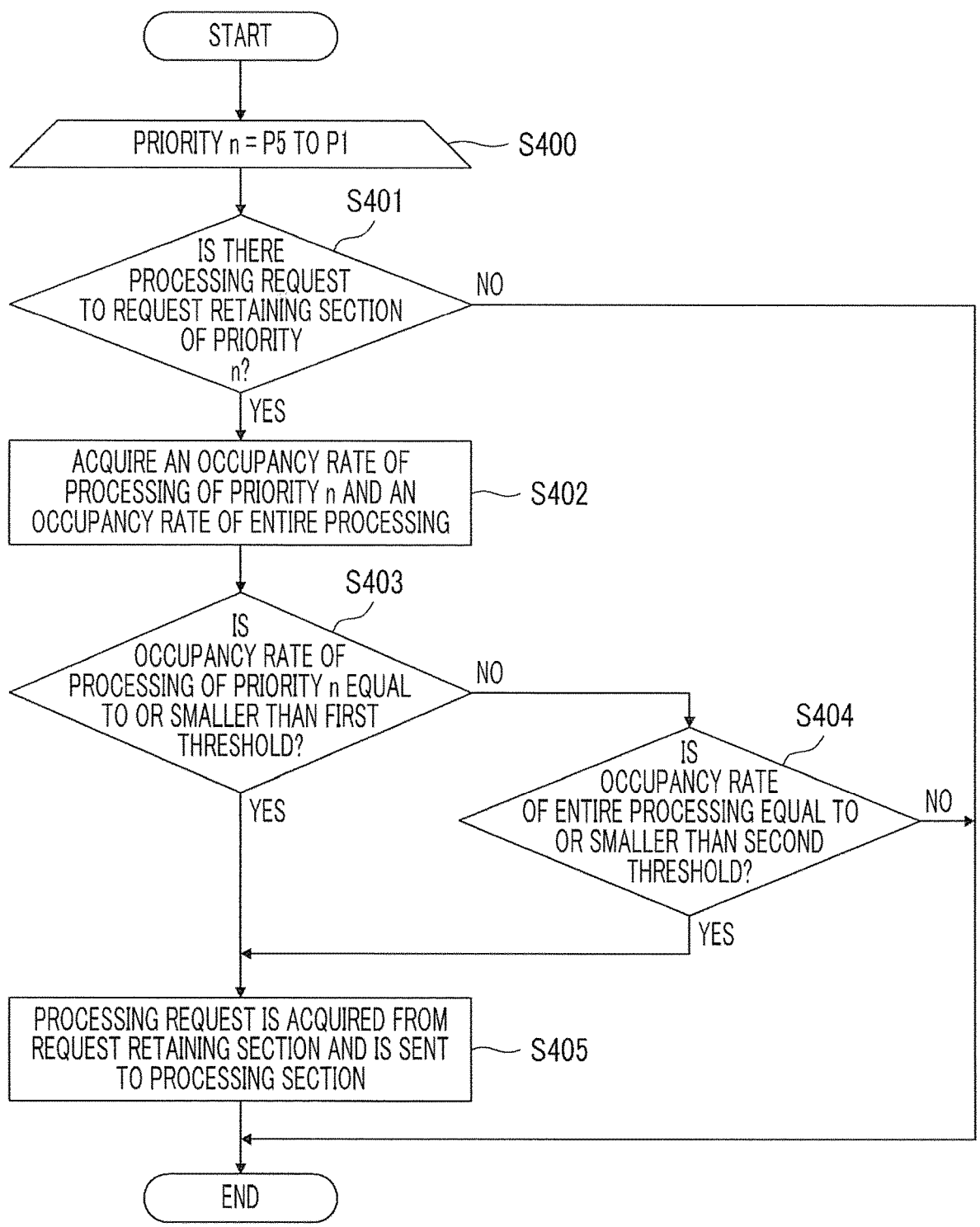
FIG. 4 is a flowchart showing a specific operation example of the control section.

Procedure of reading out processing request and a method for determining whether to read out processing request FIG. 4 is a flowchart showing a specific operation example of the control section 130. It is assumed that in a case where an operating status of the processing section 140 uses a processing capability of the processing section 140 by 100%, the control section 130 does not acquire a new processing request from the request retaining section 120. Further, in a case where there is a room for the operation of the processing section 140, as shown in FIG. 4, the control section 130 executes a series of operations in the order of priorities (sequentially from the priority n=P5 to n=P1) (S400) as follows.

The control section 130 first determines whether the processing request is retained in the request retaining section 120 of the priority n (S401). In a case where the processing request is retained, the control section 130 acquires an occupancy rate of the processing of the priority n and an occupancy rate of the entire processes of the processing section 140 (S402). The processing of the priority n refers to processing based on the processing request read out from the request retaining section 120 of the priority n. The occupancy rate of the processing of the priority n refers to a ratio of the occupancy of the processing of the priority n with respect to the entire processing capability of the processing section 140. The occupancy rate of the entire processes of the processing section 140 refers to a ratio of the processes that are being executed in the processing section 140 with respect to the entire processing capability of the processing section 140.

The control section 130 first determines whether the occupancy rate of the processing of the priority n is equal to or smaller than a first threshold (S403). The first threshold is set as the same value regardless of the priority n. For example, in a case where the first threshold is set to 5%, it is determined whether the occupancy rate is equal to or smaller than 5%, both in the processing of the priority P5 and in the processing of the priority P1.

In a case where the occupancy rate of the processing of the priority n is equal to or smaller than the first threshold (YES in S403), the control section 130 decides the request retaining section 120 of the focused priority n as an acquisition target of the processing request. Further, the processing request is acquired from the request retaining section 120 of the priority n that is the acquisition target, and is sent to the processing section 140 (S405). Accordingly, even in the case of the lowest priority P1, in a case where the occupancy rate is equal to or smaller than the first threshold (for example, 5%), the processing request is read out from the request retaining section 120, and the processing is executed by the processing section 140.

On the other hand, in a case where the occupancy rate of the processing of the priority n is larger than the first threshold (NO in S403), the control section 130 determines whether the occupancy rate of the entire processes of the processing section 140 is equal to or smaller than a second threshold (S404). The second threshold is individually set for each priority n. The second threshold for each priority n is set so that as the second threshold corresponds to a higher priority, the second threshold becomes higher. For example, the second threshold is set so that the second threshold of the priority P5 is 100%, the second threshold of the priority P4 is 90%, the second threshold of the priority P3 is 80%, the second threshold of the priority P2 is 70%, the second threshold of the priority P1 is 60%, or the like.

In a case where the occupancy rate of the entire processes of the processing section 140 is equal to or smaller than the second threshold (YES in S404), the control section 130 decides the request retaining section 120 of the focused priority n as the acquisition target of the processing request. Further, the processing request is acquired from the request retaining section 120 of the priority n that is the acquisition target, and is sent to the processing section 140 (S405). On the other hand, in a case where the occupancy rate of the entire processes of the processing section 140 is larger than the second threshold (NO in S404), the control section 130 does not set the request retaining section 120 of the focused priority n as the acquisition target of the processing request, and focuses on the request retaining section 120 of the next priority n to repeat the processes of step S401 and the subsequent steps.

In a case where the second thresholds of the priority P5 to the priority P1 are set as described above, and for example, in a case where the request retaining section 120 of the priority P5 is focused on, the control section 130 acquires the processing request from the request retaining section 120 in a case where the occupancy rate of the entire processes of the processing section 140 is equal to or smaller than 100%.

In other words, in a case where the request retaining section 120 of the priority P5 is focused on, in a case where the processing request is retained in the request retaining section 120, the processing request is necessarily read out, and the processing of the processing section 140 is executed.

On the other hand, for example, in a case where the request retaining section 120 of the priority P1 is focused on, the control section 130 acquires the processing request from the request retaining section 120 in a case where the occupancy rate of the entire processes of the processing section 140 is equal to or smaller than 60%, but in a case where the occupancy rate of the entire processes of the processing section 140 is larger than 60%, the control section 130 does not acquire the processing request from the request retaining section 120. Accordingly, the processing request retained in the request retaining section 120 of the priority P1 is read out only in a case where there is a room in the operation status of the processing section 140 (in this case, in a case where the occupancy rate of the entire processes of the processing section 140 is equal to or smaller than 60%), and the processing in the processing section 140 is executed.

The control section 130 repeats the processes of steps S401 to S405 while sequentially focusing on the request retaining section 120 of the priority P5 to the request retaining section 120 of the priority P1. Further, after the processing is performed with respect to the request retaining section 120 of the priority P1 is performed, one cycle of the operation is terminated, and then, the same cycle is repeated while focusing on the request retaining section 120 of the priority P5.

Hereinafter, the embodiments of the present disclosure have been described, but a technical range of the present disclosure is not limited to the above-mentioned embodiments. For example, in the above-described embodiments, as the amount of a used resource used for specifying a priority of a processing request, the number of times of reception of the processing request is used, but a period of time necessary for execution of processing based on the processing request may be considered. Further, as the amount of the used resource, specifically, an operating rate of the CPU, a used capacity of a storing device, or the like may be used. In addition, specific numerical values of the first threshold and the second threshold shown in the acquisition operation of the processing request in the control section 130 are only examples, and may be appropriately set in a real system. Furthermore, various modifications or changes of configurations without departing from the range of the technical field of the present disclosure are included in the present disclosure.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
a plurality of memory queues; and
a processor, configured to:
  receive a processing request issued from each of a plurality of tenants through a network, wherein the number of the memory queues is smaller than the number of the tenants;
  determine a priority of the processing request issued from each of the tenants based on a rank level of each of the tenants and an amount of resources of the information processing system to be used for a predetermined period of time for executing the respective processing request issued by each of the tenants;
  retain each of the processing requests in the memory queues according to the priorities of the processing requests;
  determine that the priority of a first processing request is equal to a first predetermined priority;
  determine a first occupancy rate of executing the first processing request by the information processing system, wherein the first occupancy rate is a ratio of the amount of information processing resources to be used by the first processing request during execution with respect to the total processing capability of the information processing system;
  determine a total occupancy rate of executing all of the processing requests by the information processing system, wherein the total occupancy rate is a ratio of the amount of information processing resources to be used by all of the processing requests during execution with respect to the total processing capability of the information processing system;

determine that the first occupancy rate is greater than a first threshold;

determine that the total occupancy rate is equal to or smaller than a second threshold;

extract the retained processing requests from the memory queues in an order specified based on the priorities of the retained processing requests; and simultaneously execute a first process corresponding to a first number of retained processing requests less than the total number of retained processing requests and a second process corresponding to the remaining retained processing requests in parallel.

2. The information processing system according to claim 1, wherein with respect to each of the rank levels of the tenants, the processor determines the priority of the processing request where the priority of the processing request becomes higher as the amount of the used resource becomes smaller.

3. The information processing system according to claim 2, wherein the processor determines the priority of each of the processing requests so that the highest priority given to the processing request issued from the tenant of a certain rank level is lower than the highest priority given to the processing request issued from the tenant of a rank level higher than the certain rank level.

4. The information processing system according to claim 1, wherein with respect to each of the tenants, the processor determines the priority of the processing request based on the amount of the used resource for the predetermined period of time, from a time point when the processing request issued from the corresponding tenant is acquired by the information processing system.

5. The information processing system according to claim 1,
wherein the processor determines whether any of the processing requests with a priority above a predetermined threshold is retained in a first memory queue among the memory queues.

6. The information processing system according to claim 1, wherein the rank level of each of the tenants is determined based on a charging plan of the tenant for using a multitenant service provided by the information processing system.

7. A method executed by a processor of an information processing system comprising:
receiving a processing request issued from each of a plurality of tenants through a network, wherein a number of memory queues of the information processing system is smaller than the number of the tenants;
determining a priority of the processing request issued from each of the tenants based on a rank level of each of the tenants and an amount of resources of the information processing system to be used for a predetermined period of time for executing the respective processing request issued by each of the tenants;
retaining each of the processing requests in the memory queues according to the priorities of the processing requests;
determining that the priority of a first processing request is equal to a first predetermined priority;
determining a first occupancy rate of executing the first processing request by the information processing system, wherein the first occupancy rate is a ratio of the amount of information processing resources to be used by the first processing request during execution with respect to the total processing capability of the information processing system;
determining a total occupancy rate of executing all of the processing requests by the information processing system, wherein the total occupancy rate is a ratio of the amount of information processing resources to be used by all of the processing requests during execution with respect to the total processing capability of the information processing system;
determining that the first occupancy rate is greater than a first threshold;
determining that the total occupancy rate is equal to or smaller than a second threshold;
extracting the retained processing requests from the memory queues in an order specified based on the priorities of the retained processing requests; and
simultaneously executing a first process corresponding to a first number of retained processing requests less than the total number of retained processing requests and a second process corresponding to the remaining retained processing requests in parallel.

8. A non-transitory computer readable medium storing a program that when executed by a processor of an information processing system performs the steps comprising:
receiving a processing request issued from each of a plurality of tenants through a network, wherein a number of memory queues of the information processing system is smaller than the number of the tenants;
determining a priority of the processing request issued from each of the tenants based on a rank level of each of the tenants and an amount of resources of the information processing system to be used for a predetermined period of time for executing the respective processing request issued by each of the tenants;
retaining each of the processing requests in the memory queues according to the priorities of the processing requests;
determining that the priority of a first processing request is equal to a first predetermined priority;
determining a first occupancy rate of executing the first processing request by the information processing system, wherein the first occupancy rate is a ratio of the amount of information processing resources to be used by the first processing request during execution with respect to the total processing capability of the information processing system;
determining a total occupancy rate of executing all of the processing requests by the information processing system, wherein the total occupancy rate is a ratio of the amount of information processing resources to be used by all of the processing requests during execution with respect to the total processing capability of the information processing system;
determining that the first occupancy rate is greater than a first threshold;
determining that the total occupancy rate is equal to or smaller than a second threshold;
extracting the retained processing requests from the memory queues in an order specified based on the priorities of the retained processing requests; and
simultaneously executing a first process corresponding to a first number of retained processing requests less than the total number of retained processing requests and a second process corresponding to the remaining retained processing requests in parallel.

\* \* \* \* \*